INVENTOR.
EDWARD A. CHILTON
BY [signature]
AGENT

INVENTOR.
EDWARD A. CHILTON
BY [signature]
AGENT

INVENTOR.
EDWARD A. CHILTON
BY Arthur T. Groeninger
AGENT

INVENTOR.
EDWARD A. CHILTON
BY [signature]
AGENT 3,308,398

TELEMETERING APPARATUS FOR CONVERTING A DIRECT CURRENT SIGNAL TO A PROPORTIONALLY VARYING FREQUENCY SIGNAL

Edward A. Chilton, Westwood, N.J., assignor to The Bendix Corporation, Teterboro, N.J., a corporation of Delaware Filed Oct. 18, 1963, Ser. No. 317,876
10 Claims. (Cl. 332—18)

The invention relates to the transmitter portion of a telemetering system and more particularly, to apparatus for converting a low level D.C. signal into an output signal having a frequency directly proportional to the D.C. signal input.

In accordance with the present invention, a transducer generates a low level D.C. signal representative of a measured quantity which is amplified by a high gain D.C. amplifier and applied to a subcarrier oscillator. The subcarrier oscillator converts the amplified signal to an output signal having a frequency which varies directly with the magnitude of the amplified signal. A feedback loop is provided which includes a frequency to voltage converter for converting variations in oscillator frequency into a variable D.C. feedback signal. The feedback signal is in opposition to the signal produced by the transducer. Because of the degenerative feedback loop and because of the very high gain of the D.C. amplifier, the accuracy of the system is substantially independent of changes in amplifier gain, and of changes in the voltages vs. frequency characteristics of the subcarrier oscillator resulting from varying operating conditions. A high accuracy burden, however, is placed on the frequency to voltage converter incorporated in the feedback path.

A frequency to voltage converter operates most accurately at low frequencies. However, operating a subcarrier oscillator in a low frequency range would reduce the useful bandwidth considerably because the property of an oscillator is such that for a wide bandwidth, a high center frequency is required.

The present invention overcomes the conflicting requirements of a high oscillator frequency and low feedback frequency by comparing the oscillator frequency with a stable fixed frequency to produce a low difference frequency. It is this low difference frequency which is fed to the frequency to voltage converter in the feedback path. Thus, the system provides a high oscillator frequency for wide bandwidth and a low feedback frequency for system accuracy.

An object of the present invention is to provide a system for accurately converting a low level D.C. signal into an output signal having a frequency directly proportional to the D.C. signal input.

Another object of the present invention is to provide a system having a frequency output proportional to a D.C. input signal and including a negative feedback loop to stabilize the system.

Another object of the present invention is to provide a system as described in the preceding paragraph including a frequency to voltage converter in the negative feedback path which operates with a high degree of accuracy because a low frequency signal is transmitted in the feedback path.

Another object of the present invention is to provide a system as described in the preceding paragraph wherein the accuracy of the overall system is dependent only on the accuracy of the frequency to voltage converter.

Another object of the present invention is to provide a system having a frequency output proportional to a D.C. input signal including a subcarrier oscillator which operates at a relatively high frequency so as to have a maximum number of cycles represent the maximum input signal.

Another object of the present invention is to provide a system as described in the preceding paragraph wherein the output frequency from the subcarrier oscillator is compared with that of a stable frequency generating system by a mixing and detecting circuit thereby providing a low difference frequency for output and feedback purposes.

Another object of the present invention is to provide a system having high and low frequency outputs proportional to a D.C. input signal.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
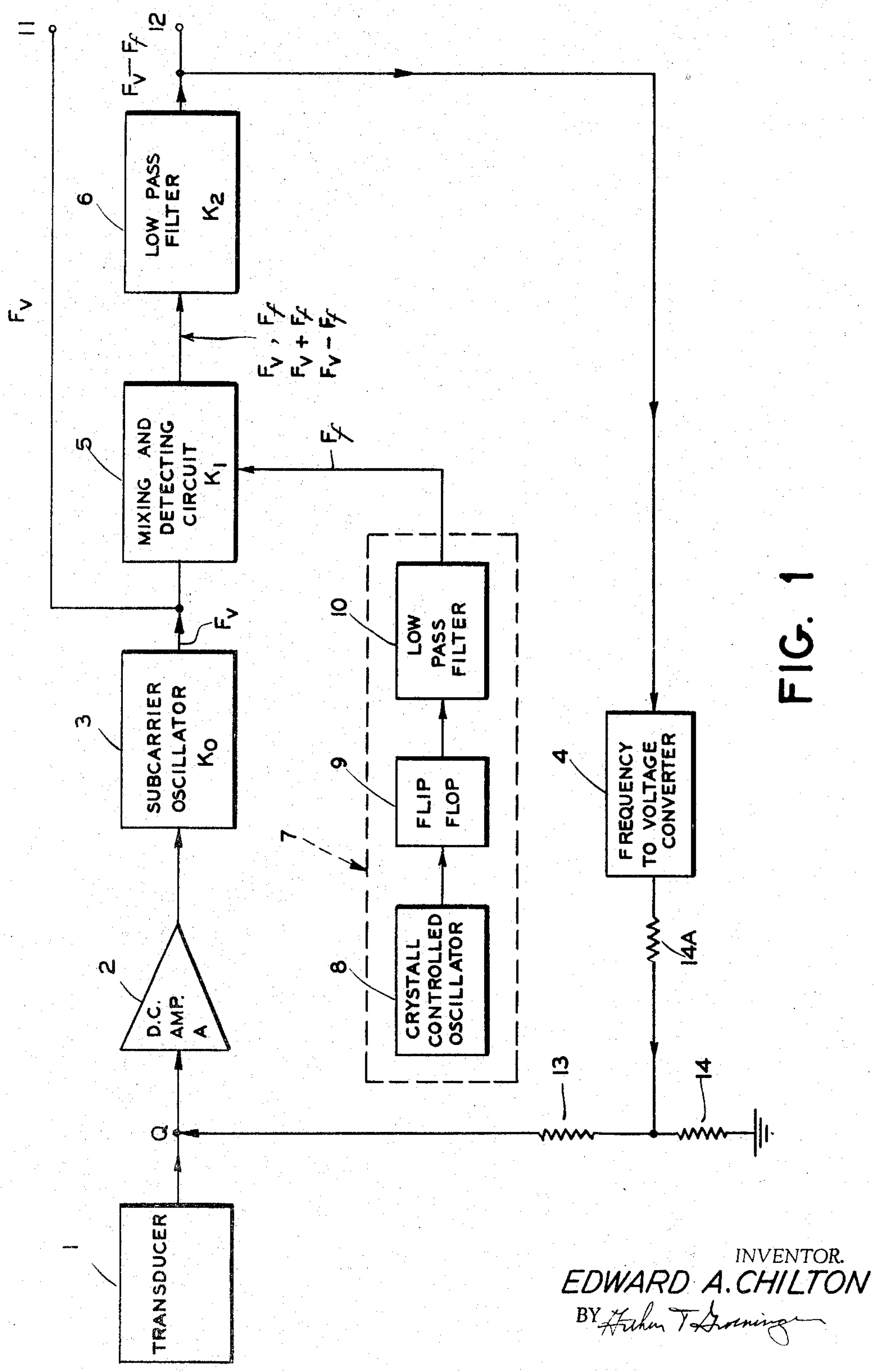
FIGURE 1 is a block diagram of the present invention.

Referring to FIGURE 1, a variable D.C. control signal derived from transducer 1 provides a signal which is applied at input terminal Q of high gain D.C. amplifier 2 for producing an amplified D.C. signal which is proportional to the signal output of the transducer 1.

A variable frequency subcarrier oscillator 3 is provided which is responsive to the output of amplifier 2. The arrangement is such that the resulting oscillations have a frequency which is proportional to the magnitude of the output of amplifier 2.

Theoretically, the subcarrier oscillator 3 should generate oscillations of constant frequency for a constant control signal; however, conventional subcarrier oscillators, of the type shown at 3, are unstable especially when subjected to varying operating voltages and severe changes in ambient temperatures. This is unsatisfactory, since a high degree of circuit linearity and a high degree of circuit stability is required over a wide range of operating conditions. Moreover, the accuracy of the system so far described is further limited by the D.C. amplifier 2 wherein problems of drift and noise associated with high gain arise.

In order to minimize the inaccuracies of amplifier 2 and oscillator 3, a frequency stabilization feedback loop is provided including a frequency to voltage converter 4 which is capable of operating with a high degree of accuracy. The output from subcarrier oscillator 3 is fed by mixing and detecting circuit 5 and low pass filter 6 to frequency to voltage converter 4 which operates to produce a D.C. feedback signal having a magnitude proportional to the frequency of oscillations of oscillator 3. The low level D.C. signal from transducer 1 and the feedback signal have opposing polarities. Both signals are combined into a composite signal (the control signal) at Q, the input to amplifier 2.

As explained by the following mathematical analysis, the negative feedback loop and the high gain D.C. amplifier 2 make the accuracy of the system substantially independent of changes in amplifier gain and oscillator characteristics which arise as a result of changing operating conditions.

If:

A is the gain of the amplifier 2,

K0 is the transfer function of the subcarrier oscillator 3,

K1 is the transfer function of the mixer 5,

K2 is the transfer function of the filter 6,

K3 is the transfer function of the frequency to voltage converter 4,

A' is the system transfer function, then, $$A'=\frac{\text{forward gain}}{1+\text{loop gain}}$$

$$A'=\frac{AK0K1K2}{1+AK0K1K2K3}$$

$$A'=\frac{1}{\frac{1}{AK0K1K2}+\frac{AK0K1K2K3}{AK0K1K2}}$$

$$A'=\frac{1}{\frac{1}{AK0K1K2}+K3}$$

and for a high forward gain, $AK0K1K2 \gg 1$ $$\frac{1}{AK0K1K2}\cong 0$$

$$A'\cong\frac{1}{K3}$$

It is evident that the overall system accuracy, while independent of variations in forward gain, A, oscillator characteristic, K0, mixer characteristic, K, and filter characteristic, K2, is dependent only upon the characteristic, K3, of the frequency to voltage converter 4 incorporated in the feedback path.

Frequency to voltage converters such as that shown at 4, operate accurately in the low frequency range. Thus, if the frequency to voltage converter 4 is operated over a low frequency range of, e.g. 0–12 kilocycles, the entire system will be highly stable despite unstable operation of components in the forward loop of the system.

Operating oscillator 3 with a center frequency in 0–12 kilocycle range would reduce the useful bandwidth considerably. That is, the property of a subcarrier oscillator is such that for a relatively wide bandwidth, a high center frequency is required. This results from the bandwidth being a fixed percentage of the oscillator frequency. From the standpoint of having a maximum number of cycles represent the maximum signal output from the transducer 1, it is advantageous to operate the oscillator 3 at as high a frequency as practicable.

The present invention overcomes conflicting requirements of the system described in the last two paragraphs by comparing the frequency, $F_v$, of D.C. controlled carrier oscillator 3 with a stable fixed frequency $F_f$ generated by the stable frequency generating system 7 in mixing and detecting circuit 5 resulting in an output that contains the frequencies $F_f$, $F_v$, $F_v-F_f$, $F_v+F_f$. Low pass filter 6 attentuates the higher frequencies $F_f$, $F_v$, $F_v+F_f$ so that the output from filter 6 contains the difference frequency, $F_v-F_f$, only. Since a signal having a low frequency, $F_v-F_f$, is transmitted in the feedback path, the operation of the frequency to voltage converter 4 is very accurate and consequently, a high degree of overall system accuracy is achieved.

It will be apparent from the foregoing that the novel system of the present invention has the desirable feature of having a high oscillator frequency for wide bandwidth while transmitting low frequencies in the feedback path which results in a more accurate system.

The output frequency $F_v$, from subcarrier oscillator 3 and the output frequency, $F_v-F_f$, from low pass filter 6 are applied to output terminals 11 and 12, respectively, and comprise useful signal outputs with the frequency of output waves therefrom varying directly with the output signal from transducer 1. Thus, the present invention has the additional feature of stable low and high frequency output signals.

Figure 2:
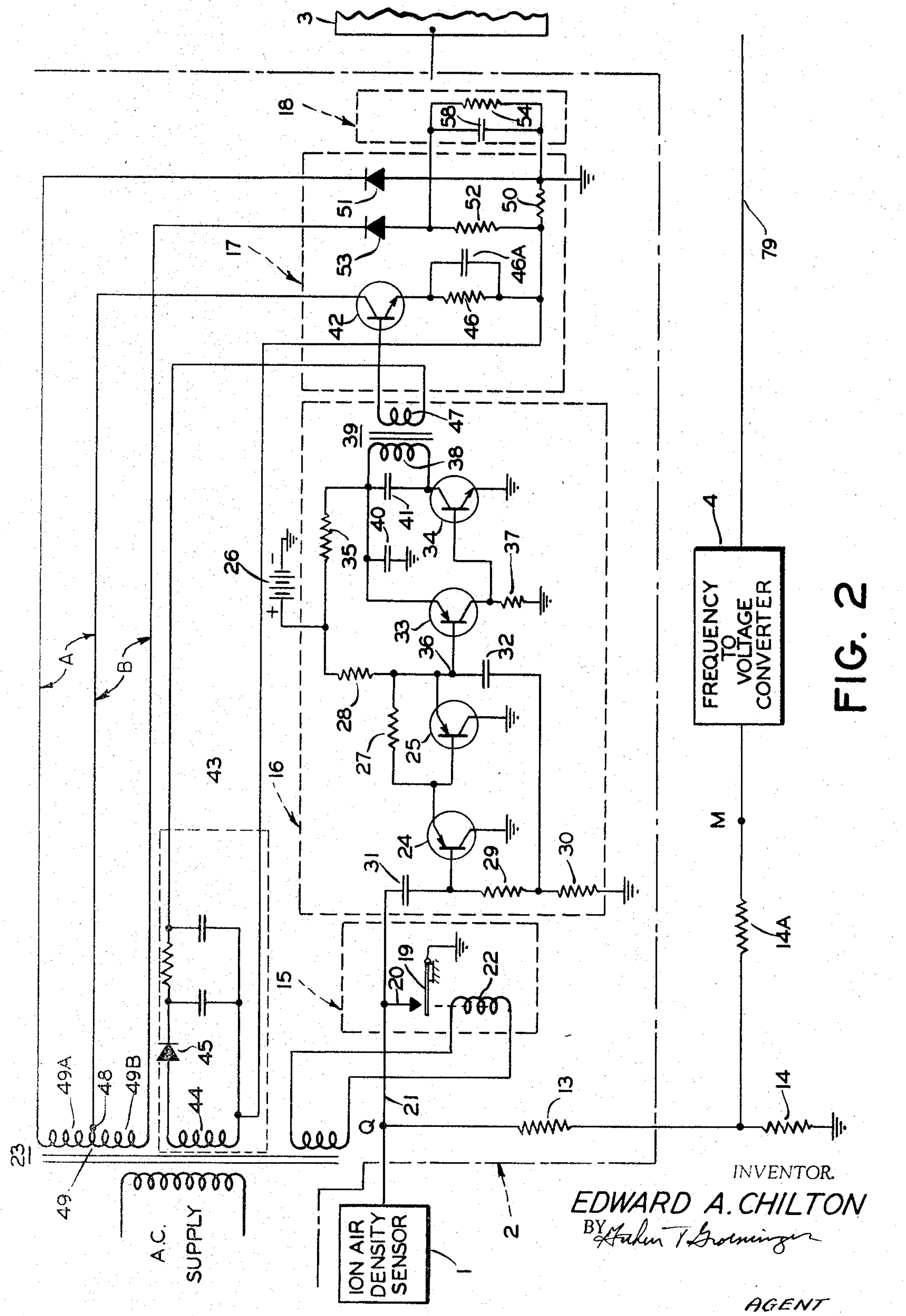
FIGURE 2 is a circuit diagram of a high gain D.C. amplifier which may be employed in the present invention.

Reference is now made to FIGURE 2 of the drawings wherein the transducer 1 is shown as being an ionization altimetry sensor of the radioactive variety such as that disclosed in copending U.S. appln. Ser. No. 693,323 filed October 30, 1957, now Patent Serial No. 3,124,744, issued June 15, 1964, by George V. Zito and assigned to the assignee of this application. The ion air density sensor 1 produces a current which flows through resistors 13, 14 producing a voltage at input terminal Q of the high gain D.C. amplifier 2.

High gain D.C. amplifier 2 includes a chopper 15 which serves to modulate or chop the D.C. input signal, an A.C. amplifier 16 for amplifying the chopped signal, and a demodulator 17 for converting the amplifier voltage to a D.C. control voltage proportional to the output of the amplifier 16 and a low pass filter 18.

The chopper 15 includes a movable contact 19 which is activated in opposite directions to alternately make and break electrical contact with a fixed contact 20. Contact 20 is connected to the input lead 21 to the chopper 15 and movable contact 19 is connected to ground. Vibrator coil 22, which is connected to a suitable source of alternating current through transformer 23, causes vibration of movable contact 19. The chopper 15, by producing a ground potential for half the time of the cycle, opens and closes the input circuit to amplifier 2 at a frequency of the alternating current source which is preferably a 400 cycle source. The input to the chopper is thereby converted into a pulsating potential at the chopper output with the magnitude of the output varying directly with the magnitude of the D.C. voltage input.

The A.C. amplifier 16 comprises a buffer section and an amplifier section. The buffer section is used to provide amplifier 16 with high input resistance. The input resistance to amplifier 16 is of the order of five to ten times greater than resistors 13 and 14 for low loading so that the transfer function of the system is independent of the amplifier characteristics.

The buffer section includes transistors 24 and 25 which are pnp transistors in the common collector configuration. The emitter of transistor 24 is connected directly to the base of transistor 25 and to the positive terminal of battery 26 by resistors 27 and 28. The collector of transistor 24 is connected to ground and the base of transistor 24 is connected to ground by resistors 29 and 30. Resistors 29 and 30 are kept low to minimize temperature effects on the bias point but large enough to preserve a high A.C. input impedance. The emitter of transistor 25 is connected to the positive terminal of battery 26 by resistor 28. Transistor 25 is forwardly biased due to the voltage drop across resistor 27. The collector of transistor 25 is directly connected to ground.

In operation, the chopper output is applied to the base of transistor 24 through coupling capacitor 31. Capacitor 31 isolates the D.C. bias conditions of the amplifier 16 from the D.C. signal input thereby eliminating drift. The output from transistor 24 is directly coupled to the base of transistor 25. The output from transistor 25 is positively fed back through capacitor 32 and the voltage divider resistors 29, 30 to the input of transistor 24. This positive feedback effectively multiplies the value of resistor 29 thereby increasing the dynamic impedance of the base emitter circuit of transistor 24. Since the amplifier input impedance is formed by the base-emitter circuit of transistor 24, the output from chopper 15 looks into a very high resistance.

A direct coupled voltage amplifier stage consists of pnp transistor 33 and npn transistor 34 connected in the common emitter configuration. The emitter of transistor 33 is connected to the positive terminal of battery 26 by resistor 35. A bypass capacitor 40 is provided to prevent A.C. negative feedback from being imposed on the emitter electrode of transistor 33. The base of transistor 33 is connected through junction 36 and resistor 28 to the positive terminal of battery 26. Transistor 33 is forwardly biased as the voltage drop across resistor 28 is much larger than the drop across resistor 35. The collector of transistor 33 is connected to ground by collector load resistor 37. The voltage developed across resistor 37 is applied to the base of transistor 34. Since the emitter of transistor 34 is connected to ground, transistor 34 is forwardly biased. The collector of transistor 34 is connected to the positive terminal of battery 26 by primary winding 38 of transformer 39 and resistor 35.

Transistors 33 and 34 are bias stabilized. The drop due to the collector current of transistor 34 causes a drop across resistor 35 which is fed back to the emitter of transistor 33, thereby stabilizing the D.C. current in transistor 33 by inverse feedback. Capacitor 41 is utilized to reduce distortion.

In operation, the output from the buffer stage is fed to the base of transistor 33. The amplified output from transistor 33 is taken from the collector circuit where a large drop is developed across resistor 37. This drop is applied to the base of transistor 34 and transistor 34 supplies additional amplification.

The output of the direct coupled stage is transferred from the collector of transistor 34, by coupling transformer 39, to the demodulator 17 and more specifically, to the base of transistor 42. Transformer 39 has a step-down turns ratio to match the high output impedance of transistor 34 to the low input impedance of transistor 42.

The demodulator 17 consists of an *npn* transistor 42 connected in the common emitter configuration. A constant current source 43 is provided comprising the secondary winding 44 of power transformer 23, rectifying diode 45 and a conventional RC filter. The constant current source is connected, respectively, by resistor 46 and secondary winding 47 of transformer 39 to the emitter and base electrodes, respectively, of transistor 42. The constant current flowing through the transistor 42 establishes a quiescent operating point for transistor 42. The collector of transistor 42 is connected to a center tap 48 of secondary winding 49 of power transformer 23. Capacitor 46A eliminates negative feedback due to resistor 46 so that transistor 42 may function as an amplifier as well as a demodulator gating transistor.

During the half cycle of energization wherein the upper terminal of winding 49 is negative with respect to the center tap 48, a voltage is generated in winding 49A and a current path (A) can be traced from the center tap 48 through transistor 42 from the collector to emitter, resistor 46, resistor 50, diode 51 and back to the upper terminal of winding 49. During the succeeding half cycle, when the lower terminal of winding 49 is negative with respect to center tap 48, a voltage is generated in winding 49B and a current path (B) can be traced from center tap 48, through transistor 42 from collector to emitter, resistor 46, resistor 52, diode 53 and back to the lower terminal of winding 49.

If the incoming signal is in phase with the signal in current path A, current will increase in path (A) and decrease in path (B); on the other half cycle, diode 51 prevents conduction in path A and excessive reverse voltage across the transistor is prevented. The increased current flowing through resistor 50 causes a positive D.C. output voltage. If the signal fed through transformer 39 is in phase with the signal in current path B, diode 53 prevents conduction in path B on one half cycle while on the other half cycle, current will increase in path B and decrease in path A. The increased current flowing through resistor 52 results in a negative D.C. output voltage.

The signal fed through transformer 39 to demodulator 17 will be in phase with the voltage generated in either winding 49A or winding 49B depending on the polarity of the output signal from transducer 1. If the output signal from transducer 1 is of positive polarity, it will be phased properly by chopper 15 from the same excitation source 22 as excites winding 49 to produce an in phase relation with the voltage generated in winding 49A. If the output signal from transducer 1 is of negative polarity, it will be phased properly by chopper 15 from the same excitation source 22 as excites winding 49 to produce an in phase relation with the voltage generated in winding 49B.

The output signal from the ion air density sensor 1 has been chosen to be of positive polarity and this signal is phased properly by chopper 15 from the same excitation source 22 as is the winding 49 to produce an inphase relation with the voltage generated in winding 49A. Thus, the output from demodulator 17 is always a pulsating signal of positive polarity but varying in magnitude depending upon the magnitude of the signal from transducer 1. It is to be understood that the output from demodulator 17 may, by fixing the polarity of the transducer output and properly phasing the input signal to the demodulator 17, always be a pulsating signal of negative polarity or a pulsating signal of both negative and positive polarity.

The output from demodulator 17 provides a controlling D.C. voltage for a subcarrier oscillator 3. As described above, the output from demodulator 17 is a pulsating D.C. voltage output; that is, it has pulses or ripples. Before this signal is applied to oscillator 3, the ripples must be removed otherwise distortion may occur. In order to reduce the magnitude of the ripples, a conventional RC filter 18 comprising resistor 54 and capacitor 55 is provided.

A suitable variable frequency subcarrier oscillator 3 is provided which is responsive to the direct voltage output of amplifier 2. The arrangement is such that the resulting oscillations have a frequency which is proportional to the magnitude of the output from the amplifier 2. The oscillator 3 may be of the type described in an article by C. M. Kortman entitled, "Application of Transistors to Telemetering Components," on page 43 of (IRE) National Telemetering Conference (Proceedings) held at Chicago, Illinois on May 24–26, 1954, (available from IEEE, New York, N.Y.).

Figure 3:
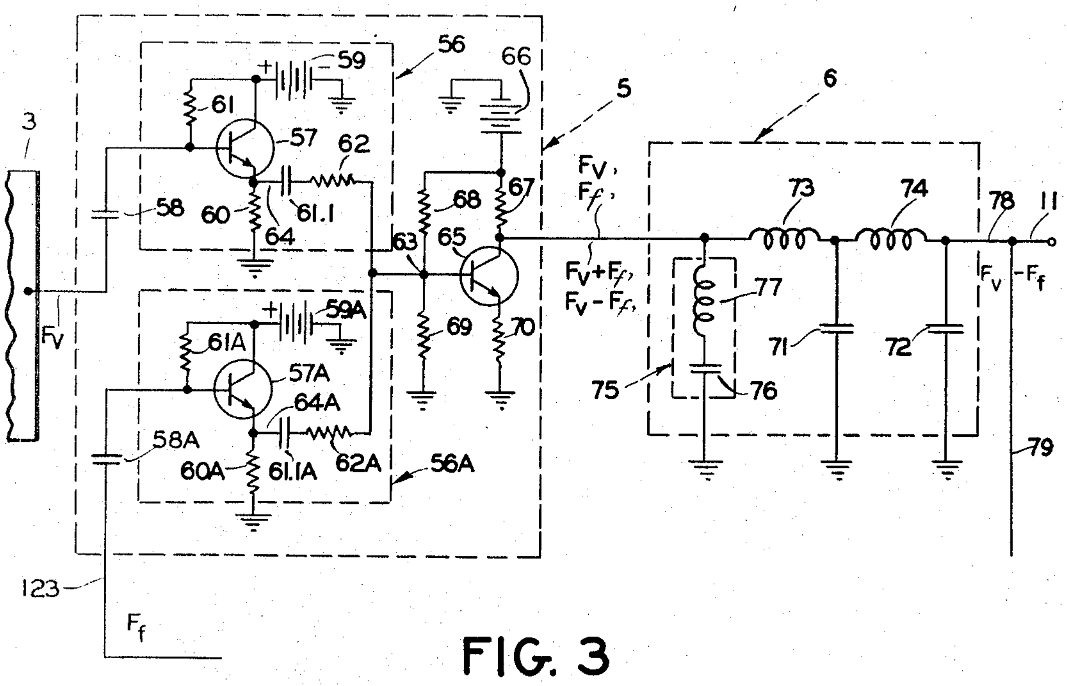
FIGURE 3 is a circuit diagram of a mixing and detecting circuit capable of being used in the present invention.

Referring to FIGURE 3, the output, $F_v$, from subcarrier oscillator 3 is applied to mixing and detecting circuit 5. The mixing and detecting circuit 5 consists of buffer stages 56 and 56A and mixing and detecting stage 65. The output, $F_f$, from a stable frequency generating system 7, which will be described further on in the specification, is also applied to the mixing and detecting circuit 5. The mixing and detecting circuit 5 compares the output frequency of the stable frequency generating system with the output frequency of voltage controlled oscillator resulting in an output that contains the frequencies $F_v$, $F_f$, $F_v - F_f$ and $F_v + F_f$.

The output $F_v$ from subcarrier oscillator 3 is applied to buffer stage 56. The output $F_f$ from the stable frequency generating system 7 is applied to buffer stage 56A via connector 123. Buffer stage 56 is identical in function and structure to buffer stage 56A, therefore only buffer stage 56 will be described. Parts in buffer stage 56A corresponding to parts in buffer stage 56 have been indicated by numerals bearing the suffix A.

The output from subcarrier oscillator 3 is applied to the base of transistor 57, in buffer stage 56, through coupling capacitor 58. Transistor 57 is an *npn* transistor in the common collector configuration which functions as a buffer to prevent excessive current drain from the subcarrier oscillator 3 thereby minimizing the effects of load on the frequency of oscillation. The collector of transistor 57 is connected to the positive terminal of battery 59. The emitter of transistor 57 is connected to ground by emitter load resistor 60. The base of transistor 57 is connected to the positive terminal of battery 59 by resistor 61 and, due to the current flow through resistor 61, forward bias is established in the base-emitter circuit.

The output from transistor 57 is fed through coupling capacitor 61.1 and current determining resistor 62 to the junction point 63; likewise the output from transistor 57A is fed through coupling capacitor 61.1A and current determining resistor 62A to junction point 63.

Transistor 57 is connected in the common collector configuration and therefore its output impedance is low. Emitter load resistor 60 is kept low. Thus, the output line 64 from transistor 57 is at a low impedance level. Similarly, output line 64A from buffer stage 56A is at a low impedance level. Due to the low impedance level of the output lines 64 and 64A, cross coupling between the buffer circuits 56 and 56A is prevented.

The two current outputs at junction 63 are fed to the base of transistor 65 which mixes, amplifies and detects the signal input. Transistor 65 is an npn transistor having a common emitter configuration. The collector of transistor 65 is connected to the positive terminal of battery 66 by resistor 67. The emitter of transistor 65 is connected to ground by resistor 70. A voltage divider network is provided consisting of a resistor 68, which is connected to the positive terminal of battery 66, and a resistor 69, which is connected to ground. The base of transistor 65 is connected to the junction of resistors 68 and 69.

The values of resistors 67, 68, 69, and 70 are chosen to bias transistor 65 and cause nonlinear class B operation such that when the signal currents of two different frequencies are applied to the input of transistor 65, only the upper half of an amplitude modulated wave consisting of four major frequencies is produced in the output. Two of the major frequencies contained in the output of mixing and detecting circuit 5 are the frequencies present in the input, $F_v$ and $F_f$. Another of the frequencies is a frequency that is equal to the sum of the two original frequencies $F_v$ and $F_f$. The remaining frequency that is present in the output is a frequency that is equal to the difference of the two original frequencies, $F_v - F_f$.

Of the several frequencies available from the output of the mixing and detecting circuit 5, only the difference frequency $F_v - F_f$ is of interest. The difference frequency, $F_v - F_f$ is a low frequency, e.g. 0–12 kilocycles, and comprises a useful alternative output signal to the relatively high frequency output from the subcarrier oscillator 3. Moreover, this low frequency signal is suitable for feedback purposes providing highly accurate frequency to voltage conversion to the feedback path which results in high degree of overall system accuracy.

In order to limit the system's second output to only the difference frequency, $F_v - F_f$, low pass filter 6 is provided. Low pass filter 6 consists of shunt capacitor 71 and 72 and series inductors 73 and 74 which eliminate the high frequency component $F_v + F_f$. The output frequencies $F_v$ and $F_f$ will be only partially attenuated by this network because of their proximity to the passed frequency, $F_v - F_f$. In order to more completely eliminate the output frequencies $F_v$ and $F_f$, the output from the mixing and detecting circuit 5 is shunted by a series resonant system 75, consisting of capacitor 76 and inductor 77, which is tuned to a frequency $F_f$. The series resonant system 75 eliminates the frequency $F_f$ and substantially eliminates the frequency $F_v$ because of its proximity to $F_f$.

The difference frequency output from low pass filter 6 is fed by lead 78 to output terminal 11 for application therefrom to a suitable telemetering circuit (not shown). The difference frequency output is further connected to the frequency to voltage converter 4 by lead 79 for feedback purposes.

The frequency to voltage converter 4 operates to produce a direct current feedback voltage having a magnitude proportional to the difference frequency output, $F_v - F_f$, from low pass filter 6. The output from low pass filter 6 is fed into the frequency to voltage converter 4 which in turn produces a D.C. voltage at point M which is of opposite polarity to the voltage output from transducer 1.

Figure 4:
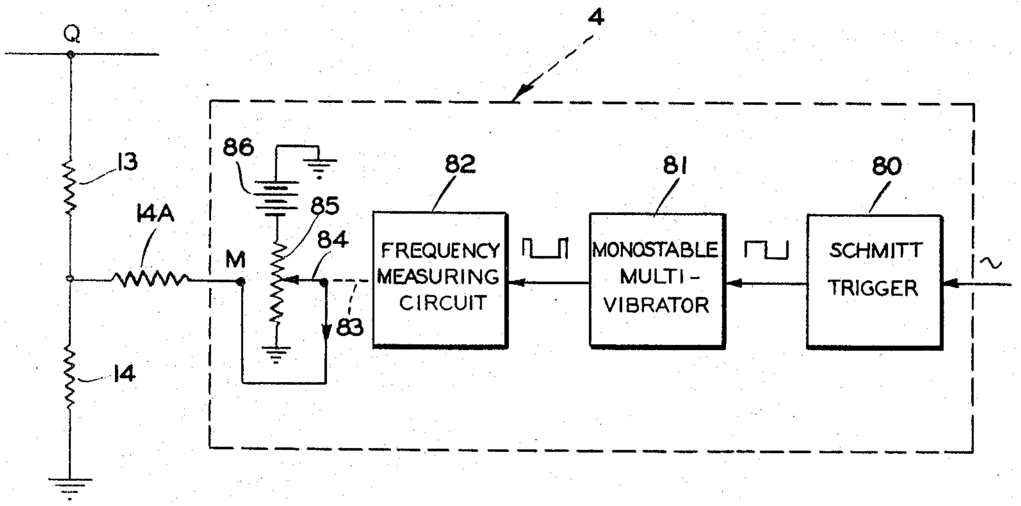
FIGURE 4 is a block diagram of the frequency to voltage converter capable of being used in the feedback path of the present invention.

The frequency to voltage converter 4 is shown in greater detail in the block diagram of FIGURE 4. However, it is to be understood that the invention is not limited to the use of a frequency to voltage converter of this particular type. Conventional saturable magnetic core type frequency to voltage converters may be utilized. A commercially available frequency to voltage converter which operates with a high degree of accuracy is a frequency to voltage converter of the type manufactured by Pioneer Magnetics Corporation, Santa Monica, California, type TA–F, model M.C. 1200A, Ser. No. 745, and known as a "Magacycler."

Referring to FIGURE 4, the frequency to voltage converter 4 is shown as comprising a Schmitt trigger circuit 80, a monostable multivibrator 81, a frequency measuring circuit 82, and means, including a mechanical connection 83, slider 84, potentiometer 85 and a regulated D.C. supply 86, responsive to the output from the frequency measuring circuit 82 for providing a voltage at point M proportional to the low difference frequency, $F_v - F_f$, which is transmitted in the feedback path.

In operation, the low difference frequency, $F_v - F_f$, is transmitted by conductor 79 to the Schmitt trigger 80. Schmitt trigger 80 converts the output sine wave into an output square wave. The Schmitt circuit may be of the type shown and described on pages 208–210 of the Department of the Army publication, "Basic Theory and Application of Transistors," Technical Manual 11–690, published by the Government Printing Office, Washington, D.C. The output wave from the Schmitt circuit 80 is fed to a monostable multivibrator 81.

The monostable multivibrator 81 functions to provide output pulses of constant height and width and having a time duration such that it is compatible with the requirements of the frequency measuring circuit 82. The monostable multivibrator 81 may be of substantially the same type shown and described on page 10–2 in Department of the Navy publication "Handbook Preferred Circuits," vol. II, Navweps 16–1–519–2. The monostable multivibrator therein described need only be modified by regulating all supply voltages and substituting npn transistors for pnp transistors so that the pulses are positive going.

The frequency measuring circuit 82 includes means, responsive to the pulsating output of multivibrator 81, for rotating an output shaft through an angular displacement proportional to the frequency of an input pulse. The frequency measuring circuit 82 may be of the type shown and described in an article by J. Mitchell entitled, "An Analog Frequency-Measuring Circuit Accurate to 0.1 Percent," pages 983–984, A.I.E.E. Transactions, vol. 77, part 1, Communications and Electronics. The frequency measuring circuit in Mitchell provides accurate frequency measurement to a maximum frequency of 40 kilocycles.

At times, it has been found desirable to operate the subcarrier oscillator 3 in a range above 40 kilocycles, and sometimes in a range substantially above 40 kilocycles, e.g. above 100 kilocycles. This is because the property of a subcarrier oscillator is such that for a relatively wide bandwidth, a high center frequency is required. The desirability of operating the subcarrier oscillator 3 in a high frequency range need not be sacrificed because of the high frequency limitations of frequency measuring circuit 82 because, in accordance with the present invention, a difference frequency is transmitted in the feedback path and this is kept well below 40 kilocycle maximum of frequency measuring circuit 82. For example, if $F_v$ is varied between 46 and 58 kilocycles, the feedback signal may be kept below the 40 kilocycle maximum of the frequency measuring circuit 82 by making $F_f$ 46 kilocycles. The frequency measuring circuit 82 would then operate in a 0–12 kc. range. Since the frequency measuring circuit operates in a frequency range below 40 kilocycles, the frequency to voltage conversion in the feedback path is accomplished with a high degree of accuracy.

The output shaft of frequency measuring circuit 82 is connected by a mechanical linkage 83 to the slider arm 84 of potentiometer 85 such that the arm 84 is adjusted in proportion to the frequency of the input pulse applied to measuring circuit 82. Battery 86 provides a negative voltage at the end of the potentiometer winding 85 so that the output voltage at point M is of opposite polarity to the output voltage from transducer. It is to be understood that potentiometer winding 85 would be connected to the positive terminal of battery 86 if the output from the transducer were negative so that the feedback voltage operates in opposition to the measured voltage.

Part of the voltage at point M, as determined by the voltage divider network, comprising resistors 14A and 14, is fed back to the input junction Q. The feedback voltage is in opposition to the voltage produced by the transducer 1. As previously described, negative feedback makes the overall accuracy of the system independent of changes in amplifier gain and changes in the subcarrier oscillator characteristics. The accuracy of the overall system is made dependent only on the accuracy of the frequency to voltage converter 4 incorporated in the feedback path. As noted above, the frequency to voltage converter 4 operates with a high degree of accuracy as the feedback frequency is less than 40 kilocycles. Thus, a high degree of overall system accuracy is achieved.

Figure 5:
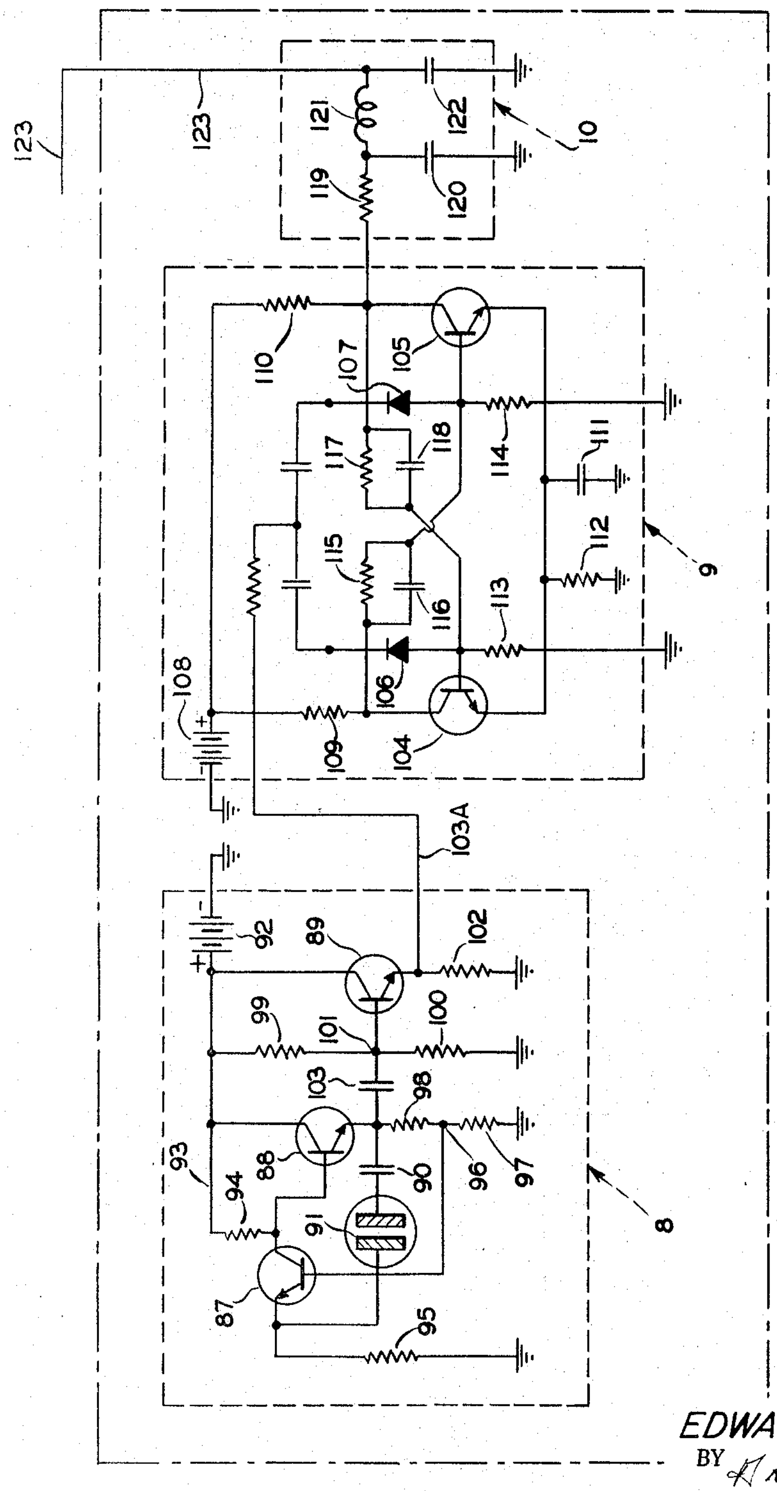
FIGURE 5 is a circuit diagram of the stable frequency generating system which may be employed in the present invention.

Referring to FIGURE 5, the stable frequency generating stage comprises a crystal controlled oscillator 8, a flip-flop 9 and a low pass filter 10. Crystal oscillator 8 generates a stable fixed frequency square wave. Flip-flop 9 functions as a frequency divider and low pass filter 10 converts the square wave from the flip-flop into a sine wave.

The crystal oscillator 8 comprises a transistor amplifier 87, and transistors 88, 89 which serve as buffers to minimize the effect of the load on the frequency of oscillation, a feedback network including capacitor 90 and crystal 91 to provide positive feedback to sustain oscillation. The crystal 91, included in the feedback path, determines the frequency of oscillation of the resultant square wave.

Transistor 87 is of the npn type connected in a common base configuration. A positive bias potential from battery 92 is fed by power supply line 93 to the collector of transistor 87 through the collector load resistor 94. The emitter of transistor 87 is connected to ground by a resistor 95. The base of transistor 87 is positively biased by the potential existing at junction 96 between resistors 97 and 98. Resistors 97 and 98 form a voltage divider network with resistor 97 connected to ground and resistor 98 connected to the power supply line 93 by the collector emitter circuit of transistor 88.

Transistor 88 is an npn transistor connected in the common collector configuration. The collector output from transistor 87 is connected to the base of transistor 88. The collector of transistor 88 is connected to power supply line 93 and positively biased thereby. The output of the emitter of transistor 88 is positively fed back to the input Q at the emitter of transistor 87 by capacitor 90 and crystal 91. Since transistor 88 is connected in the common collector configuration, it has a high input impedance and excessive current drain from transistor 87 is prevented. Moreover, transistor 88 allows coupling from the high impedance collector circuit of transistor 87 back to the low impedance base emitter circuit of transistor 87 for positive feedback.

Transistor 89 is of the npn type having a common collector configuration. The collector of transistor 89 is connected to power supply line 93 which provides a positive bias for the collector. A voltage divider network comprising resistors 99 and 100 is connected between the power supply line 93 and ground. The positive potential existing at the junction 101 of resistors 99 and 100 is applied to the base of transistor 89. The emitter of transistor 89 is connected to ground by resistor 102.

In operation, oscillations are initially generated by noise introduced by transistor 87. These noise signals contain all frequencies; however, only one frequency, as determined by crystal 91 (i.e. the natural resonant frequency of the crystal), is positively fed back from the emitter of buffer transistor 88 to the emitter of transistor 87 to sustain oscillations. Capacitor 90 functions to eliminate any D.C. voltage from being impressed across the crystal. The signal at the emitter of transistor 88 is then applied through the capacitor 103 to the base of transistor 89 which is connected in the common collector configuration to serve as a buffer to prevent flip-flop 9 from loading down the oscillator circuitry.

The stable frequency signal generated by crystal oscillator 8 is applied by lead 103A to flip-flop 9 which functions as a frequency divider.

Flip-flop 9 includes transistors 104 and 105. The stable frequency signal derived from crystal oscillator 8 is connected to the bases of transistors 104 and 105 by diodes 106 and 107 respectively. Diodes 106 and 107 serve to steer the signals so that only negative going pulses are applied to the bases of transistors 104 and 105. The collectors of transistors 104 and 105 are connected to a source of positive potential comprising battery 108 through the load resistor 109 and 110. The emitters are connected together and to ground through the parallel circuit of capacitor 111 and resistor 112. The bases of transistors 104 and 105 are connected to ground, respectively, by resistors 113 and 114. The collector of transistor 104 drives the base of transistor 105 through the parallel circuit of the resistor 115 and the capacitor 116. The collector of transistor 105 drives the base of transistor 104 through the parallel circuit of the resistor 117 and the capacitor 118.

For purposes of explaining the operation of the flip-flop 9, assume that the flip-flop 9 is in such a state that transistor 105 is cutoff and transistor 104 is conducting. A negative pulse from crystal oscillator 8 is passed through diodes 106 and 107 to the bases of transistors 104 and 105. Since the transistor 105 is cutoff, the negative pulse on its base will have no effect. The transistor 104, however, is conducting and the negative pulse on its base has the effect of decreasing the current flow through the transistor and the voltage of the collector rises. This rise is impressed on the base of transistor 105, which therefore begins to conduct and the collector potential of this transistor decreases. This decrease is passed to the base of the transistor 104 causing a still further decrease in current flow. This action is cumulative so that the collector potential of transistor 104 rises steeply and that of transistor 105 falls steeply. If the flip-flop starts out in a condition such that the transistor 105 is conducting and the transistor 104 is cut off, then a negative input pulse will cause a switching in the opposite direction so that the transistor 105 is cut off and the transistor 104 starts conducting. Each time a negative pulse is applied to each of the bases of the transistors 104 and 105, the transistor which formerly was conducting is cutoff while the other transistor starts conducting, thus switching the flip-flop from one state to the other. A waveform is thereby generated at the collector of the transistor 105 at one half the frequency of the output from crystal oscillator 8.

The output from flip-flop is applied to filter 10 comprising an R.C. filter including resistor 119 and capacitor 120 and an L.C. filter comprising inductor 121 and capacitor 122. The filter 10 changes the output from the flip-flop 9 from a square wave to a sine wave. The sine wave output is then applied by lead 123 to mixing and detecting circuit 5, the structure and operation of which has been described in detail above.

*Operation*

The operation of the present invention is believed apparent from the above description. Briefly, however, it will be noted that transducer 1 generates an output signal of one polarity which is balanced against a feedback signal of opposite polarity. The resulting signal is a control signal which represents the algebraic sum of the signal from transducer 1 and the feedback signal. The control signal is modulated, amplified and demodulated by amplifier 2 and applied to subcarrier oscillator 3. The subcarrier oscillator 3 converts the amplified signal to an output signal having a frequency which varies directly with the magnitude of the signal output from transducer 1. The output from oscillator 3 comprises a useful output signal. The output from oscillator 3, $F_v$, is also fed to a mixing and detecting circuit 5 where it is compared with a stable fixed frequency, $F_f$, provided by stable frequency generating system 7. The output from the mixing and detecting circuit 5 is filtered by low pass filter 6 providing an output signal which represents the difference frequency $F_v-F_f$. The difference frequency, $F_v-F_f$ is of relatively low frequency and as such comprises a useful alternate output signal and a suitable feedback signal. By transmitting a low frequency signal in the feedback path, the frequency to voltage converter 4 in the feedback path operates with a high degree of accuracy resulting in a high degree of overall system accuracy as the accuracy of the overall system is dependent only on the accuracy of the frequency to voltage converter 4 incorporated in the negative feedback path.

Although only one embodiment of the invention has been illustrated and described in detail, it is to be expressly understood that the invention is not limited thereto. Various changes can be made in the design and arrangement of the parts without departing from the spirit and scope of the invention as will now be understood by those skilled in the art.

What is claimed is:

1. Apparatus for converting a D.C. signal into an output having a frequency directly proportional to said D.C. signal, comprising a transducer for generating an output signal, a subcarrier oscillator having input and output circuits, a feedback path coupling said input and output circuits, said feedback path including a frequency to voltage converter for generating a feedback signal in opposition to the input signal, a high gain D.C. amplifier for amplifying a control signal formed of said transducer output and said feedback signal, said oscillator being responsive to said amplified control signal to generate a first output having a frequency directly proportional to said amplified control signal, means for generating oscillations of stable frequency, means responsive to the output of said stable frequency generating means and to said first output for generating a second usable output of lower frequency directly proportional to the D.C. signal, said frequency to voltage converter being responsive to said second output of lower frequency whereby it is capable of operating with a high degree of accuracy.

2. Apparatus as defined by claim 1 wherein said stable frequency generating means includes a crystal controlled oscillator.

3. Apparatus as defined by claim 1 including frequency divider means for dividing the frequency output of said oscillator.

4. Apparatus of the kind described comprising a transducer for generating an output representative of a measured quantity, an oscillator including input and output circuits, a feedback path coupling said input and output circuits, said feedback path including converter means for generating a feedback signal opposing the transducer output, said oscillator being responsive to a control signal formed of said transducer output and said feedback signal to generate a first output having a frequency directly proportional to said transducer output, means for generating oscillations of stable frequency, means responsive to the output of said stable frequency generating means and to said first output for generating a second usable output having a frequency directly proportional to said transducer output and of lower frequency than said first output, said converter means being responsive to said second output of lower frequency.

5. Apparatus defined by claim 4 including a high gain D.C. amplifier for amplifying said control signal.

6. Apparatus defined by claim 4 wherein said transducer comprises an ion air density sensor.

7. Apparatus as defined by claim 4 wherein said converter means comprises a frequency to voltage converter.

8. Apparatus as defined by claim 4 wherein said last mentioned means comprises a mixing and detecting circuit for generating an output signal having a frequency representative of the difference between said stable frequency and the frequency of said first output, and filter means for limiting the output of said mixing and detecting circuit to said difference frequency.

9. Apparatus as defined by claim 4 wherein said stable frequency generating system includes a crystal controlled oscillator.

10. Apparatus for providing an output having a frequency corresponding to a direct current input signal, comprising means for providing a variable direct current input signal, an oscillator having an input connected to the input signal means and providing an output of varying frequency, means for generating an output of stable frequency, means connected to the oscillator and to the stable frequency generating means for providing an output corresponding to the difference in frequencies of the varying frequency and stable frequency, a feedback circuit including a frequency to voltage converter connecting the frequency difference means to the oscillator input and providing a direct current feedback signal in opposition to the input signal, and output means connected to the frequency difference means and providing a usable output having a frequency corresponding to the direct current input signal.

References Cited by the Examiner

UNITED STATES PATENTS

| | | | |
|---|---|---|---|
| 2,662,214 | 12/1953 | Hugenholtz | 332—19 |
| 2,768,293 | 10/1956 | VanHofweegen | 332—19 X |
| 3,030,582 | 4/1962 | Holcomb et al. | 332—19 X |
| 3,124,744 | 6/1964 | Zito | 324—33 |

ROY LAKE, *Primary Examiner.*

ALFRED L. BRODY, *Assistant Examiner.*